US012777046B2

(12) United States Patent
Kilmer et al.

(10) Patent No.: US 12,777,046 B2
(45) Date of Patent: Oct. 27, 2026

(54) RECEIVING SECURED DATA USING OPTICAL CODES AND URLs

(71) Applicant: CargoSense, Inc., Reston, VA (US)

(72) Inventors: Richard Allen Christopher Kilmer, Clifton, VA (US); Benjamin Aaron Wilson, Falls Church, VA (US)

(73) Assignee: CargoSense, Inc., Reston, VA (US)

( * ) Notice: Subject to any disclaimer, the term of this patent is extended or adjusted under 35 U.S.C. 154(b) by 95 days.

(21) Appl. No.: 18/390,748

(22) Filed: Dec. 20, 2023

(65) Prior Publication Data

US 2024/0214391 A1  Jun. 27, 2024

Related U.S. Application Data

(60) Provisional application No. 63/434,265, filed on Dec. 21, 2022.

(51) Int. Cl.
*H04L 9/40* (2022.01)
*G06F 16/955* (2019.01)
*G06K 7/14* (2006.01)

(52) U.S. Cl.
CPC ........ *H04L 63/126* (2013.01); *G06F 16/9554* (2019.01); *G06F 16/9566* (2019.01); *G06K 7/1417* (2013.01)

(58) Field of Classification Search
None
See application file for complete search history.

(56) References Cited

U.S. PATENT DOCUMENTS

| | | | | |
|---|---|---|---|---|
| 2020/0193370 | A1* | 6/2020 | Kilmer | G06K 19/06028 |
| 2021/0366429 | A1* | 11/2021 | Shin | G09G 3/3677 |
| 2022/0366429 | A1* | 11/2022 | Pati | G06Q 30/012 |
| 2023/0273968 | A1* | 8/2023 | Ando | G06F 16/9566 707/769 |

* cited by examiner

*Primary Examiner* — Cai Y Chen
(74) *Attorney, Agent, or Firm* — Morrison & Foerster LLP

(57) ABSTRACT

A method for receiving secured data, comprising: at a mobile device comprising an optical sensor: detecting an optical code by the optical sensor, wherein the optical code is physically associated with an entity that is being monitored. The method further comprises decoding a URL encoded in the optical code, wherein the URL comprises a signature and comprises an indication of a service endpoint for performing validation of the signature. The method further comprises transmitting the URL to a server. At the server: the method further comprises accessing the service endpoint represented by the URL for performing validation of the signature, and in accordance with receiving a positive validation result for the signature, storing data for one or more parameters associated with the entity.

20 Claims, 8 Drawing Sheets

*FIG. 3*
2022-06-11 15:42
ROOM 1234
F9C8F435-E0F2-44D3-962D-2AFFF6BAA179
TEMPERATURE
4.3°C
HUMIDITY
58%

RECEIVING SECURED DATA USING OPTICAL CODES AND URLs

CROSS-REFERENCE TO RELATED APPLICATIONS

This application claims the benefit of U.S. Provisional Application No. 63/434,265, filed Dec. 21, 2022, the entire contents of which is incorporated herein by reference.

FIELD

This disclosure generally relates to securely receiving data and more specifically to receiving data using optical codes and URLs.

BACKGROUND

Modern network systems involve multiple components that transmit data to one another in order to reflect and potentially record measurements, the occurrence of events, and/or other information. Although there are many different ways to transmit data, different requirements introduce additional challenges in implementing an effective data transmission system. In distributed systems, it is challenging to provide endpoints which can receive data in a way that does not require traditional authentication. However, even though designing a system that can receive data is possible, challenges arise in ensuring the process is secure and does not require traditional authentication, while still limiting the data received to that which is allowed. A basic approach using cookies may enable submission of data, but this can be easily thwarted either manually or by programmatically driving services to submit falsified data. For example, a user may use a previous cookie to submit either false or potentially malicious information, or a script may be configured to execute before data is sent to a server in order to alter or falsify data.

SUMMARY

The present disclosure describes a method to allow the secure submission of data through the use of URLs that encode data and take the place of submitting raw data. A URL that indicates a service endpoint and includes a signature, and potentially data that is embedded into the URL, may be submitted to a service instead of submitting raw data. The URL is then called by the service which accesses the endpoint indicated by the URL. Using signed URLs, upon accessing or requesting the endpoint indicated by the URL, the service is authenticated into that endpoint. The endpoint then validates the authenticity of the signature in the URL as a measure of the integrity of the data corresponding to the signed URL.

In some embodiments, an optical code that encodes a signed URL and potentially additional data may be provided or displayed. A user may then detect or scan the optical code with an optical sensor, and subsequently decode the signed URL and any potential data from the optical code. The signed URL along with any potential data may then be transmitted to a server, where the server's network address may either be known beforehand or obtained separately from another source, such as another optical code. The server may first verify whether the domain of the signed URL may be trusted, before accessing the service endpoint indicated by the signed URL in order to validate the signature in the URL by the remote endpoint. Once a positive validation result is received for the signature, the server may retrieve any data corresponding to the signed URL, whether from the signed URL or as a response from the service endpoint indicated by the signed URL, and perform any further processing.

In various embodiments, a method for receiving secured data includes: at a mobile device comprising an optical sensor: detecting an optical code by the optical sensor, wherein the optical code is physically associated with an entity that is being monitored. The method further includes decoding a URL encoded in the optical code, wherein the URL includes a signature and includes an indication of a service endpoint for performing validation of the signature. The method further includes transmitting the URL to a server. At the server, the method further includes accessing the service endpoint represented by the URL for performing validation of the signature, and in accordance with receiving a positive validation result for the signature, storing data for one or more parameters associated with the entity.

Optionally, the URL includes the data for the one or more parameters associated with the entity.

Optionally, the signature is generated based on the data for the one or more parameters.

Optionally, the data includes measurement data associated with the entity.

Optionally, the data includes identifying information associated with the entity.

Optionally, the service endpoint and the server are associated with a same domain.

Optionally, accessing the service endpoint for performing validation of the signature includes sending the signature to the service endpoint.

Optionally, accessing the service endpoint includes sending the data for the one or more parameters to the service endpoint.

Optionally, accessing the service endpoint includes sending authentication information used for authenticating into the service endpoint.

Optionally, the method further includes: in accordance with receiving the positive validation result and prior to storing the data for the one or more parameters, extracting the data from the URL Optionally, the method further includes: in accordance with receiving the positive validation result and prior to storing the data for the one or more parameters, receiving the data from the service endpoint.

Optionally, the method further includes: at the server, prior to accessing the service endpoint, determining that a domain of the service endpoint is a trusted domain.

Optionally, determining that the domain is a trusted domain includes comparing the domain against a list of trusted domains, wherein the list of trusted domains is determined based on a profile corresponding to the URL.

Optionally, the method further includes, at an optical code display device, generating and displaying the optical code.

Optionally, the optical code display device automatically updates the optical code at predetermined time intervals.

Optionally, the method further includes: at the mobile device prior to detecting the optical code, detecting a second optical code indicating a network address of the server.

Optionally, the method further includes, in response to detecting the second optical code, displaying a prompt to detect the optical code.

Optionally, the method further includes transmitting an identifying value of a second entity to the server, wherein the identifying value is decoded from the second optical code, and wherein the second entity is associated with the entity that is being monitored.

In various embodiments, a system for receiving secured data is provided, the system including one or more processors and memory coupled to the processors including instructions executable by the processors, the processors being operable when executing the instructions to cause the system to detect an optical code by the optical sensor, wherein the optical code is physically associated with an entity that is being monitored. The instructions further cause the system to decode a URL encoded in the optical code, wherein the URL includes a signature and includes an indication of a service endpoint for performing validation of the signature. The instructions further cause the system to transmit the URL to a server. At the server, the instructions further cause the system to access the service endpoint represented by the URL for performing validation of the signature, and in accordance with receiving a positive validation result for the signature, storing data for one or more parameters associated with the entity.

In various embodiments, one or more computer-readable non-transitory storage media embodying software for receiving secured data is provided, the software including instructions operable when executed by a computing system to detect an optical code by the optical sensor, wherein the optical code is physically associated with an entity that is being monitored. The instructions are further operable when executed to decode a URL encoded in the optical code, wherein the URL includes a signature and includes an indication of a service endpoint for performing validation of the signature. The instructions are further operable when executed to transmit the URL to a server. At the server, the instructions are further operable when executed to access the service endpoint represented by the URL for performing validation of the signature, and in accordance with receiving a positive validation result for the signature, storing data for one or more parameters associated with the entity.

DETAILED DESCRIPTION

Figure 1:
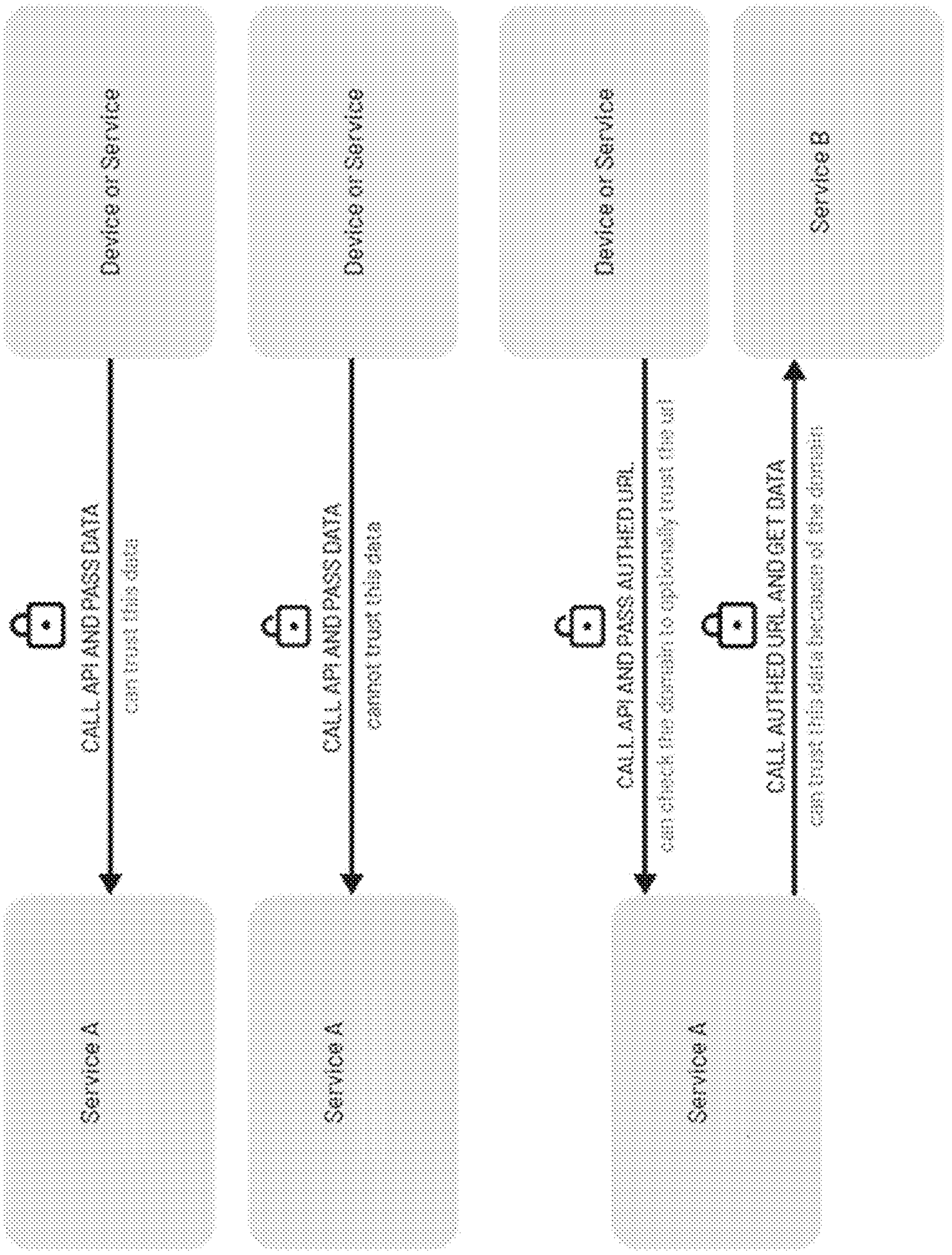
FIG. 1 illustrates an exemplary scenario that may be addressed by the present disclosure.

FIG. 1 illustrates an exemplary scenario that may be addressed by the present disclosure. Starting at the top of the figure, a device or service may call an API and pass data to a service, Service A, where the service may subsequently process that data for various purposes. The configuration of Service A may be that the service assumes the data it receives is not malicious and can be trusted through the use of authorization. However, as illustrated in the second exchange in the middle third of FIG. 1, it may be the case that the data Service A receives from a device or service through an API cannot be trusted as the data may be malformed and/or malicious, whether intentionally or unintentionally. Consequently, systems may aim to provide a method in which services like Service A are able to securely receive data. However, an additional design goal may be to enable Service A to securely receive data without requiring traditional authentication processes, such as due to authentication processes being too cumbersome or time-consuming. Accordingly, the present disclosure describes a method for a device or service to call an API and pass an authenticated URL instead of directly passing the data, as illustrated by the exchange from the device or service to Service A shown at the bottom of FIG. 1. The service may then check the domain of the authenticated URL to optionally trust the URL. To do so, Service A may call the authenticated URL to access another service, Service B, and subsequently get the data from Service B. Service B may thus effectively serve as a validator for the trustworthiness of the data that Service A receives. The present disclosure further considers a number of variations for different steps of this process.

Figure 2:
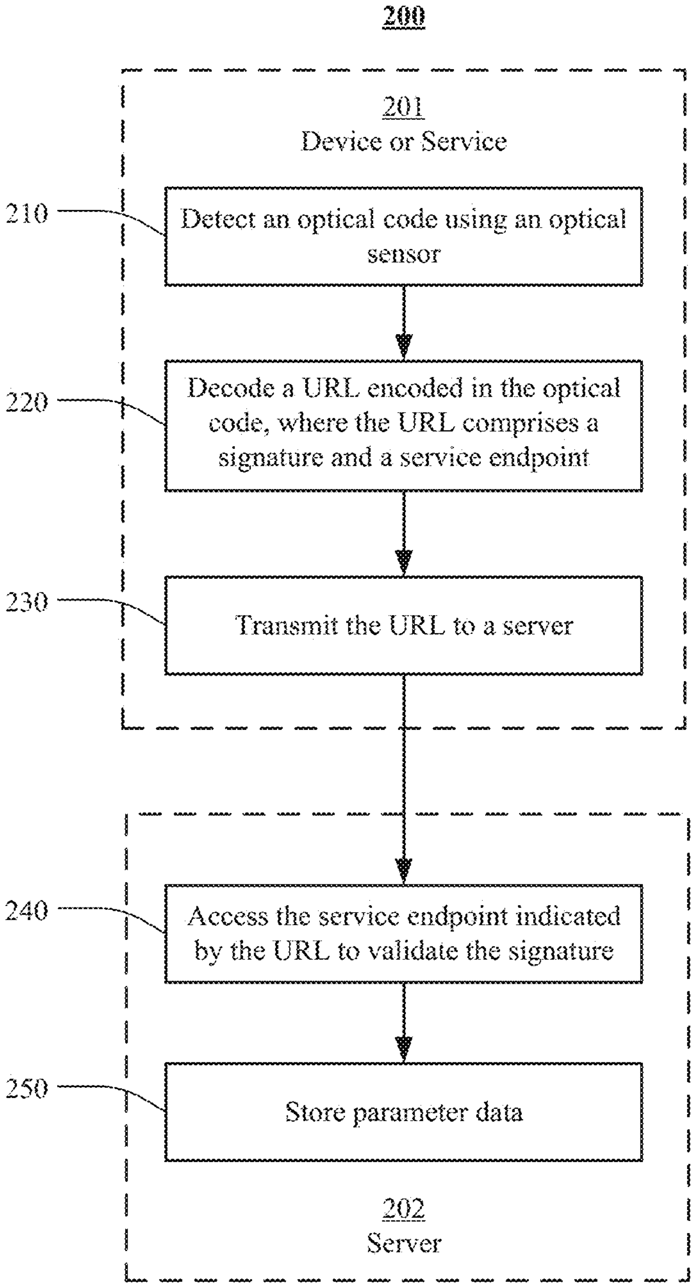
FIG. 2 depicts steps in an example method for receiving secured data through optical codes and URLs.

FIG. 2 depicts steps in an example method 200 for receiving secured data through optical codes and URLs. As indicated by 201 of method 200, steps 210-230 may be performed by a device or service, while the remaining steps 240-250 may be performed by a server. In various embodiments, a service as referenced herein may comprise any software related service provided by one or more processors, such as mobile applications or web servers. The device or service 201 may be any appropriate system that is capable of executing steps 210-230 as described herein, and the server 202 may be any server capable of executing steps 240 and 250 as described herein.

Method 200 may begin at step 210 where the device or service 201 detects or scans an optical code using an optical sensor, where the optical sensor may be part of the device or service, or may be a separate device that is associated or linked to the device or service. The optical code may be physically associated with an entity that is being tracked or monitored for any appropriate purpose. The entity may refer to anything that is being monitored as appropriate in different embodiments, which may include a physical location or a movable asset. For example, if a room in a building is being monitored, the optical code may be placed somewhere in that room, such as on a wall, and may be used to uniquely identify the room. The optical code may also be displayed in various manners in different embodiments, such as a laminated print-out or on the display screen of a device which is then physically associated with the entity, such as being attached on the wall of a physical location. A user may then detect or scan the optical code with the optical sensor when the user brings the optical sensor within some proximity to the optical code. Thus, the optical code being scanned and subsequently decoded may indicate that a user has arrived within some proximity with the entity being monitored.

Additionally, as part of monitoring the entity, data for various parameters associated with the entity may be monitored and/or recorded. This may include, for example, data for miscellaneous parameters such as a timestamp associated with the entity, measurement data such as the temperature or humidity at the entity, or identifying data such as a commonly used name or latitude-longitude coordinates for the entity. Various sensors and measuring devices may be used in order to generate the data for the different parameters. Alternatively, the data may be pre-generated and entered manually into the device or service by an authorized user. The manually entered data may comprise static data that does not change and thus may be inefficient to actively monitor, or it may relate to some parameter that is tracked but not measured by a device, such as an identifier for the entity being monitored. In instances in which the optical code is displayed on a dynamic electronic display device, data for monitored parameters may be displayed alongside the optical code to provide a user of the optical code with various information associated with the entity. In various embodiments, the sensors and measuring devices that generate the parameter data and a device that displays the optical code may all be supported by a single device. In various embodiments, the optical code may also be configured to encode a portion or all of the parameter data that may be displayed alongside it.

Figure 3:
FIG. 3 depicts an example display of an optical code with various data.

FIG. 3 depicts an example display on a device that may display the optical code and the data for various parameters associated with an entity to be monitored, which in this example may be a physical location like a room in a building. In the example, the optical code is displayed as a Quick Response code (QR code) in the center, while a timestamp for the entity is displayed at the top, an identifier of the entity is displayed below the time, and the temperature and humidity associated with the entity is displayed below the optical code. The data for some or all of the parameters, such as the temperature and humidity, may be generated using some physical sensor components that are integrated into the display device, or may be generated by separate devices that are linked to the display device. The QR code also may or may not encode the data for the various parameters. In various embodiments, the optical code may remain static and is never updated. This may be the case if the optical code encodes a static URL with a static signature, thus removing a potential need to update the optical code. However, even if the optical code may remain static, the data for the parameters that are displayed may still be dynamically updated with the most current values.

The optical code may be a dynamic optical code that is periodically updated in response to one or more trigger conditions and/or in accordance with some time interval. The device displaying the optical code may generally be in a low power state while displaying the optical code and various parameter data in order to conserve power. At some time interval, such as once or twice every minute, the display device may awaken into a high power state in order to update the optical code on its screen. Once the optical code has been updated, the display device may display the updated optical code and return to its previous low power state. As part of this process, the display device may also update the parameter data. If the data is generated by separate devices, the display device may query those devices to retrieve the latest parameter data; if the parameter data is generated using components onboard the display device, the device may take new measurements of the parameters and display the updated data. In various embodiments where the parameter data may be encoded into the optical code as discussed further herein, the updated parameter data may also be re-encoded into the updated optical code as part of this process. Additionally, a new or updated signature and URL may also be generated during this time and then re-encoded into the updated optical code. Similarly, new or updated authentication data which may be needed in subsequent steps of method 200 as described further herein may also be generated and subsequently re-encoded into the updated optical code. In the example of FIG. 2, the current timestamp that is displayed is 2022-06-11 15:42, the current temperature is 4.3 degrees C., and the humidity is 58%, but after the device displaying that information awakens into its high power state to update the displayed information, the time displayed may change to 2022-06-11 15:43, the temperature may become 4.5 degrees C., and the humidity may become 60%. To obtain the new data, the display device may have taken new measurements using various components available on the display device itself, or queried other sensors or measuring devices to retrieve the latest data. Alternatively, the display device may awaken into the high power state to update the optical code when it senses that some trigger condition has been met. Various trigger conditions may be appropriate, such as the value for a certain parameter changing beyond a predefined threshold. Specifically, a threshold of 0.5 degrees C. may be defined for the temperature parameter, and if the display device, or an associated monitoring device specially configured to monitor for such events, detects that the difference between the current temperature and the temperature currently encoded in the displayed optical code, the display device may awaken into the high power state even if the time interval has not been satisfied. The threshold may be adjusted depending on how precisely the optical code should reflect the current state of the various parameters. In various embodiments, the threshold may be defined such that the display device awakens into the high power state whenever any updated data is detected for any parameter.

Referring back to method 200, at step 220, the method may decode a Uniform Resource Locator (URL) from the optical code. This URL may include a domain and endpoint, but the device or service 201 may treat the URL as a string of text instead of a web service endpoint to connect to. Although the service endpoint may not be accessed immediately as part of step 220, the endpoint may be accessed in subsequent steps of method 200 as described further herein. In addition to the domain and endpoint, the URL may also include other elements, particularly a special string of characters that constitute a digital signature. Since this URL includes a signature, the URL may also be referred to as the signed URL herein. The signature may be a dynamic signature that is also updated whenever the optical code is updated. Using the example in FIG. 3, when the display device awakens from a low power mode to a high power mode to update the optical code, the digital signature may also be updated. The signed URL may then be updated with the new signature, thus allowing the signed URL and optical code to remain consistent, where a new optical code also corresponds to a new signed URL due to the updated signature. Alternatively, the signature may instead be a static signature that remains unchanged. Additionally, the signature may be generated in various ways and thus take various forms. For example, the signature may be a hash that is produced from applying a one-way hash function to some set of data. Another way to generate the signature may be through public-key cryptography. In these embodiments, a component like the display device that may be responsible for generating the signatures may be granted access to a public key, with an encryption generated from the public key being the signature. Although the signature may be generated in any number of ways, the process of validating the signature that may occur in subsequent steps may be limited as that process may need to correspond to how the signature was generated, as described further herein.

In various embodiments, the signature may also be based on the parameter data associated with the entity. For example, the signature may be a hash that is generated from applying a hash function to the temperature and humidity data associated with the entity. In such cases, the parameter data may also be included in the signed URL as it may be needed in subsequent steps to enable validation of the signature. In other words, while it may generally be optional to include the parameter data in the signed URL, it may become necessary to include the parameter data in the signed URL in various embodiments when the signature is generated based on the parameter data. Since the parameter data may include both identifying information about the entity (such as a name for a physical location or the latitude-longitude coordinates of a physical location) as well as various measurement data (such as the temperature or humidity at a physical location), a signed URL including parameter data may thus include identifying information and measurement data associated with the entity. Further, the service endpoint indicated by the signed URL that may be accessed in subsequent steps of method 200 may include an authentication process before the endpoint may be fully accessed. As such, the signed URL may also include authentication information that may be needed to access the service endpoint. Like the parameter data, including the authentication information may be optional and dependent on the particular service endpoint indicated in the signed URL.

Additionally, the process of decoding the URL from the optical code may vary in different embodiments depending on what is encoded in the optical code. In various embodiments, the optical code may directly encode the string of characters comprising the signed URL such that decoding the optical code directly returns the URL as a string of characters. However, in various other embodiments, the optical code may separately encode components of the URL in the optical code which then must be combined by the device or service 201 in order to obtain the full URL as a string of characters. For example, the optical code may separately encode a domain and endpoint with a unique identifier as the parameter data for generating the signature. The purpose of this may be to shorten the encoding of the URL with the unique identifier, such that the unique identifier may be encoded instead of a fully qualified URL in order to produce a smaller optical code When decoding the optical code, the individual components may be retrieved, as the unique identifier may be expanded to the domain, endpoint, and parameter data, and the signature may be generated using the parameter data. The individual components may then be concatenated together to form the full signed URL.

The following is an example signed URL that may be decoded from the optical code as part of step 220: https://example.com/qrsensor_fetch?u=F9C9F435-EOF2-44D3-962D-2AFFF6BAA179&t=2022-06-13T11:13:00Z&s=61679610857230893242832447767578366064141995144386584505389583 6167961085723089324283244776757836606414199514438658450538958366115268616 79610. Table 1 illustrates the various elements in the example signed URL and the content corresponding with each element. In this particular example, the signed URL includes the data of two parameters associated with an entity, a universally unique identifier (UUID) and a timestamp. Although the example signed URL presents the elements in a certain order, other signed URLs may have various elements in different orders.

TABLE 1

| Element | Content |
|---|---|
| Domain | https://example.com |
| Endpoint | qrsensor_fetch |
| u (UUID) | F9C9F435-E0F2-44D3-962D-2AFFF6BAA179 |
| t (timestamp) | 2022-06-13T11:13:00Z |
| s (signature) | 61679610857230893242832447767578366064141995 144386584505389583661152686167961085723089324283244776757836606414199514438658450538958366115268 |

A second example signed URL may be: https://qrsensor-.com/locator?u=F9C9F435-EOF2-44D3-962D-2AFFF6BAA179&name=MY%20ROOM%201234511414&lat=38.83486068576362&lon=-77.42490173199695&t=2022-06-13T11:13:00Z&temp=33.1&hum=55.1&s=616796108572308932428324477675783660641419 9514438658450538958366115268616796108572308932428324477675783660641419951443865845053895836611 5268. Table 2 illustrates the various elements in the second example signed URL and the corresponding contents for the elements. As illustrated in this example and table 2, the signed URL decoded at step 220 may include a large number of elements, including data for numerous parameters. Whereas the first example signed URL only included the UUID and timestamp, the second example signed URL also includes a name for the entity being monitored, the latitude-longitude coordinates of the entity, the temperature, and the humidity.

TABLE 2

| Element | Content |
|---|---|
| Domain | https://qrsensor.com |
| Endpoint | locator |
| u (UUID) | F9C9F435-E0F2-44D3-962D-2AFFF6BAA179 |
| name | MY ROOM 1234511414 |
| lat (latitude) | 38.83486068576362 |
| lon (longitude) | −77.42490173199695 |
| t (timestamp) | 2022-06-13T11:13:00Z |
| temp (temperature) | 33.1 |
| hum (humidity) | 55.1 |
| s (signature) | 61679610857230893242832447767578366064141995 144386584505389583661152686167961085723089324283244776757836606414199514438658450538958366115268 |

At step 230, the device or service 201 may transmit the signed URL decoded in step 220 to a server 202. As mentioned above, the signed URL may be treated as a string of characters instead of an active web service endpoint, so transmitting the signed URL to the server at step 230 may also be considered transmitting a string of characters that take the form of a URL. A network address for the server 202 may be known beforehand to the device or service 201 as the server's address may be statically stored in an associated memory of the device or service. As such, the device or service may retrieve the server's address from memory to automatically establish a connection with the server using the address at some time before transmitting the URL to the server, which may be before step 230 or as part of step 230. An alternative approach may be for the device or service 201 to obtain the server's address from an external source prior to or as part of step 230. For example, the server's address may be obtained by decoding the address after detecting or scanning another optical code which is separate from the optical code encoding the signed URL. However, regardless of the exact approach for identifying and connecting to the server, step 230 may be satisfied as long as the signed URL decoded at step 220 is transmitted to the server.

At step 240, the server 202 may access the service endpoint that is indicated in the URL transmitted in step 230 to perform validation of the signature in the URL. As mentioned above, when the signed URL is decoded at step 220, the URL at that time may be treated as a string of characters instead of a service endpoint. However, at step 240, the signed URL may be treated as a service endpoint that is used as part of validating the signature in the URL. In various embodiments, the service endpoint and the server may be associated with the same domain. For example, the service endpoint may be indicated by https://example.com/qrsensor_fetch, and the server may also be associated with example.com. This may be the case if both the service endpoint and the server are part of or associated with some organization example. In various other embodiments, the service endpoint and the server may be associated with different domains. For example, while the server may be associated with example.com, the service endpoint may be associated with another domain like qrsensor.com. However, the validation of the signature in step 240 may proceed in largely the same manner in both cases.

When accessing the service endpoint indicated by the signed URL in embodiments where the domain of the service endpoint is different from the server, it may be necessary to first verify that the signed URL references a trusted domain. The domain may be verified by comparing against a list of trusted domains in a data storage (such as non-volatile RAM or a database) accessible by the server 202. Additionally, the list of trusted domains may also be configurable through a profile that may be associated with the network address of the server (e.g., an originally scanned URL). The profile may initially have various database records associated with it that store various information regarding the server, but the profile may subsequently be expanded to include a list of trusted domains that are stored in additional database records that are also associated with the profile, where the list of trusted domains may also be updated as necessary. After the domain has been verified the server 202 may access the service endpoint indicated by the signed URL, such as by submitting an HTTP GET request to the service endpoint. As mentioned above, the service endpoint may be configured to perform an authentication step before the endpoint can be accessed. For example, the server may send some authentication information as part of accessing the endpoint, where the authentication information may take various forms and may overlap with some of the parameter data. For example, an authentication ID and password may be some special sequence of characters, separate from any of the data for the parameters associated with the entity being monitored, that is stored internally by the server which is submitted along with the GET request. Alternatively, the authentication ID may be the data for one of the parameters, like the UUID. Various embodiments may implement the authentication process in various ways, such as comparing various parts of the authentication information, like an ID and password, provided by the server against ground truth versions stored at the service endpoint. In any case, once the server authenticates into the service endpoint, if necessary, the service endpoint may then proceed with validating the signature.

In order for the service endpoint to access the signature, the server may send the signature when accessing the endpoint, such as by including the signature in the request line, body, or header of the GET request. The service endpoint may then validate the signature in a manner corresponding to how the signature was generated. For example, if the signature is a hash generated by applying a hash function on some underlying data, the service endpoint may apply that same hash function to the same underlying data before comparing the resulting hash to the signature. Alternatively, if the signature is an encryption produced from a public key in a public key cryptography system, the service endpoint may use a private key to verify the encryption was generated from a corresponding public key. As mentioned above, in various embodiments, the signature may be based on the data for the parameters associated with an entity being monitored. In such embodiments, the server may also send the parameter data when accessing the service endpoint so the endpoint may use the data to validate the signature. For example, if the signature is a hash based on the parameter data, the service endpoint may generate a new hash using the parameter data to subsequently compare against the signature. Additionally, a random identifier (e.g., nonce) may be included as part of the parameter data in the signed URL, where this random identifier may be included in what is signed, while the service endpoint may store a list of random identifiers it has previously received. In various embodiments, the service endpoint may reject any request with a previously received random identifier, which may prevent the "replay" of a particular signed URL to reduce the likelihood of a denial of service attack against the service endpoint. Alternatively, the service endpoint may accept requests with previously received random identifiers, but impose a threshold on the amount of time that must elapse before the subsequent request with the same random identifier is accepted. For example, the service endpoint may impose a threshold of 5 minutes, in which case requests with the same random identifier must be received at least 5 minutes apart by the service endpoint for both requests to be accepted. Various values may be appropriate for the threshold (such as 5 minutes, 1 hour, or 24 hours), and the threshold may also be adjusted after being initialized. However, it may be noted that just like how there may be many ways that the signature is generated, there may also be many other ways to validate the signature at step 240.

After validating the signature, the service endpoint may then send a response to the server with the validation results. If the response from the service endpoint indicates that signature validation failed, that may indicate to the server that whatever source submitted the signed URL is not a trusted source. Accordingly, the server may choose to terminate processing for the submission corresponding to the signature. In various embodiments, this may mean the server completely terminates all processing immediately and effectively ignores or discards that submission. Alternatively or additionally, the server may transmit a response to the device or service 201 that originally submitted the signed URL with a notification that the signature was invalid or failed to be validated. The response may be transmitted in case the failed signature validation was just a coincidence and that the signed URL should be submitted again (which may require re-executing steps 210-230).

On the other hand, the response from the service endpoint may indicate that the signature was successfully validated. As part of or along with the response, the service endpoint may return the data for parameters associated with the entity, perhaps using a JavaScript Object Notation (JSON) document. In embodiments where the signed URL transmitted to the server at step 230 only included the signature but no parameter data, the parameter data may be included in the response. To that end, the service endpoint may be configured to identify a corresponding set of parameter data to be returned as a response whenever such a request for signature validation is received. With this approach, the service endpoint may control when and what data should be made available to the server 202. For example, the data may be private or confidential, and validating the signature may enable the service endpoint to determine whether the data should be made accessible to the server 202, and if data should be made accessible, what sets of data should be made accessible. However, the parameter data may also be returned with the response from the service endpoint even in embodiments where parameter data is already included in the signed URL, which may be the case if the server is not equipped with the ability to decode the parameter data from the signed URL. In this case, the service endpoint may decode the parameter data from the signed URL after validating the signature, or before validating the signature if the parameter data was needed in order to validate the signature. On the other hand, instead of returning the parameter data as part of or along with the response, the service endpoint may just return a response indicating whether the signature was successfully validated. If the response indicates that the signature was validated, the server 202 may then proceed with decoding the signed URL in order to extract the parameter data from the URL. These embodiments may assume the server is able to decode the various parameters and corresponding data from the URL, and the service endpoint is mainly relied upon to validate the signature.

At step 250, once the server 202 has acquired the data for the parameters associated with the entity that is being monitored, the server may store the data, or process the data in any other manner as appropriate in various embodiments. Although step 250 may depend on the signature in the signed URL being successfully validated at step 240, step 250 may include any operations that can be performed on the parameter data that is appropriate once the signature in the signed URL has been validated.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for receiving secured data through optical codes and URLs including the particular steps of the method of FIG. 2, this disclosure contemplates any suitable method for receiving secured data through optical codes and URLs including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

As mentioned above with respect to step 230 of method 200, the device or service 201 may obtain the network address of the server 202 from an external source, particularly another optical code separate from the one encoding the signed URL that is detected or scanned at step 210. Because this second optical code may encode the server address, it may be scanned at any time prior to step 230, or as part of step 230, as the device or service 201 may only need to obtain the server's address at some point before it is needed to transmit the signed URL to the server. In addition to the server's address, this second optical code may also encode other information that may not be available through the primary optical code that encodes the signed URL. For example, the second optical code may encode identifying information for a second entity that is associated or becomes associated with the original entity that is being monitored. For example, if the first entity was a physical location that is being monitored, the second entity may be an object that arrives at the physical location. When the second optical code is detected or scanned, the server's network address may be decoded, a connection with the server may be established, and any identifying information for a second entity may also be transmitted to the server, either separately from or even as part of the signed URL.

Figure 4:
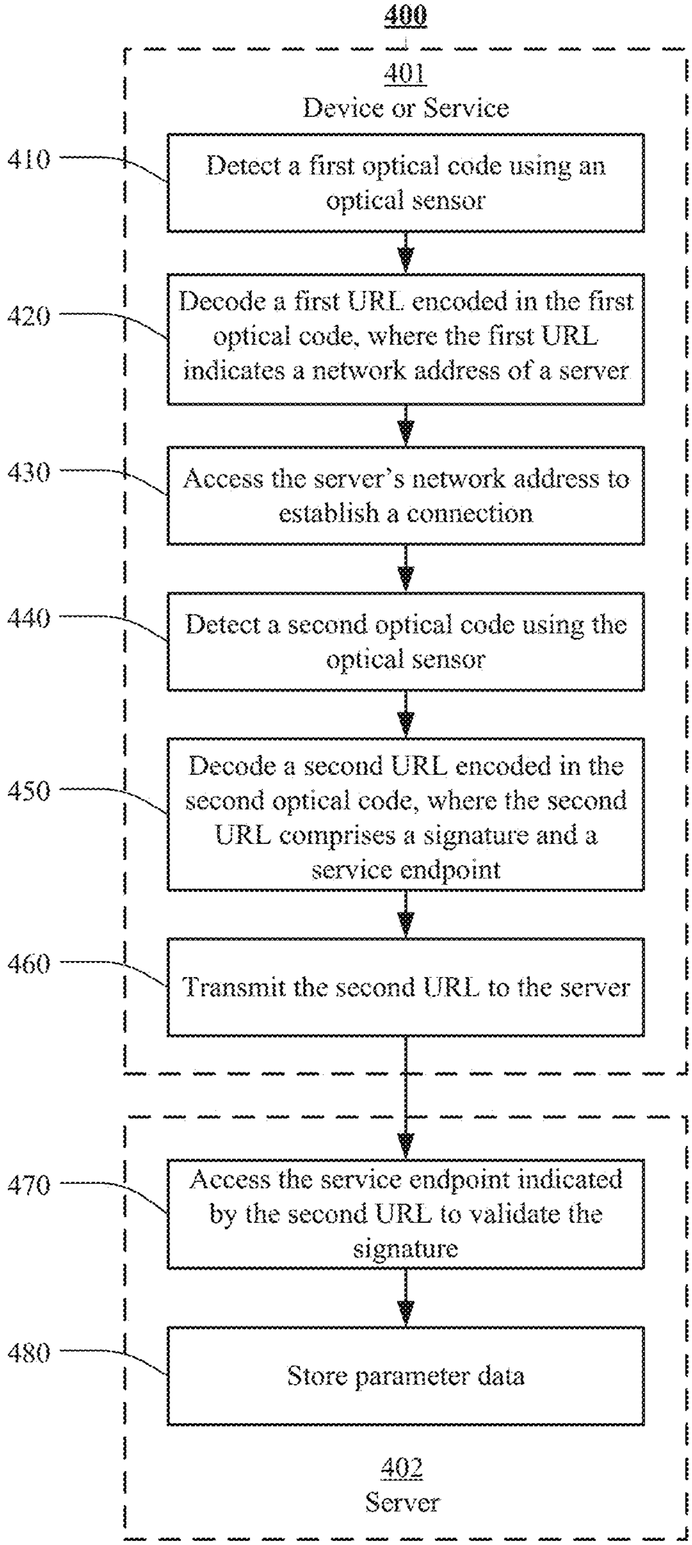
FIG. 4 depicts steps in an example method for receiving secured data using two optical codes, one encoding the server's network address and the other encoding the signed URL.

FIG. 4 depicts steps in an example method 400 for receiving secured data using two optical codes, one encoding the server's network address and the other encoding the signed URL. Specifically, a device or service may detect or scan a first optical code encoding the server's network address to establish a connection to the server when decoded. The server may then return instructions to the device or service to scan a second optical code encoding a signed URL in order to securely transmit data to the server. As illustrated in the figure, steps 410 to 460 may be executed by a device or service 401 while steps 470 and 480 may be executed by a server 402. In various embodiments, the device or service 401 of FIG. 4 may correspond to the device or service 201 of FIG. 1, and the server 402 of FIG. 4 may correspond to the server 202 of FIG. 1. The method 400 may start at step 410, where the device or service 401 may detect or scan a first optical code using an optical sensor. This first optical code may encode the network address of the server as well as other information such as identifying information for an entity like an object, as described above. Then at step 420, the device or service 401 may decode a first URL from the first optical code. This first URL may indicate the network address of the server 402 to which the device or service should connect. At step 430, the device or service 401 may access the server's network address in order to establish a connection between the device or service and the server. This may be accomplished in any appropriate manner, such as by using transmission control protocol (TCP). After the connection is established, any additional information that may have been decoded from the first optical code at step 420 may be immediately transmitted to the server where it is eventually matched with the signed URL that is transmitted in subsequent steps. Alternatively, the additional information may continue to be buffered until the signed URL is decoded, at which point it may be incorporated into and transmitted to the server as part of the signed URL.

At step 440, the device or service 401 may detect or scan a second optical code using the optical sensor where the second optical code encodes the signed URL. As part of this step or immediately preceding this step, the device or service 401 may display a prompt for a user of the device or service to scan a second optical code. In various embodiments, step 440 may correspond with step 210 of method 200. At step 450, the device or service 401 may decode a second URL from the second optical code, where the second URL is the signed URL comprising a signature and a service endpoint. In various embodiments, step 450 may correspond to step 220 of method 200. At step 460, the device or service 401 may transmit the second URL, or the signed URL, to the server 402. In cases where some additional information was decoded from the first optical code at step 420 but not immediately transmitted to the server when the connection was established at step 430, that additional information may be incorporated into the signed URL and transmitted to the server as part of step 460. In various embodiments, step 460 may correspond to step 230 of method 200. Subsequently, the server at step 470 may access the service endpoint indicated by the second, or signed, URL in order to validate the signature in the signed URL, which in various embodiments may correspond to step 240 of method 200. And at step 480, the server may store the data for various parameters associated with an entity, such as a physical location, that is being monitored or any other kind of processing as appropriate in different embodiments, where step 480 in various embodiments may correspond to step 250 of method 200.

Figure 5:
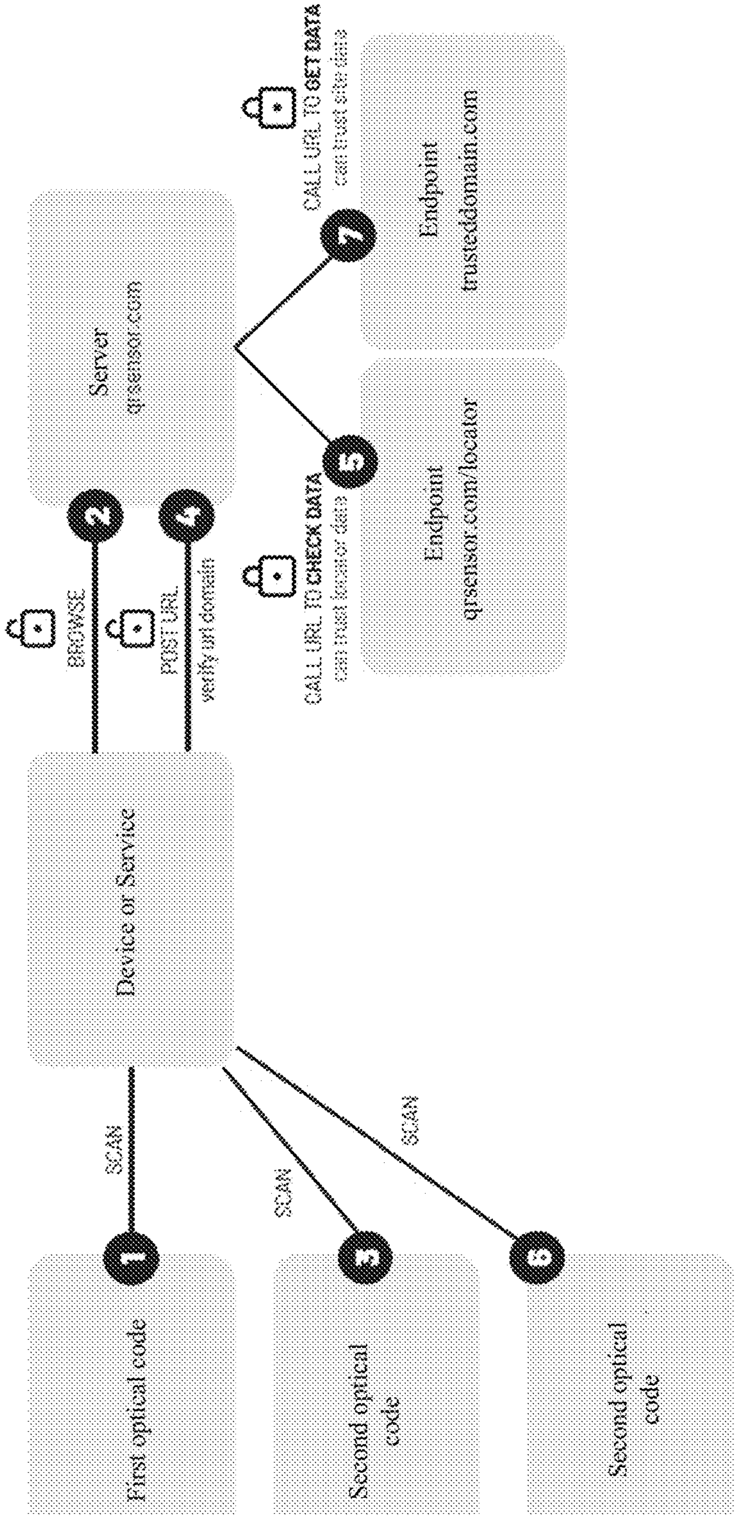
FIG. 5 illustrates an example schematic of the components and steps when receiving secured data through optical codes and URLs.

FIG. 5 illustrates an example schematic of components of a system that may perform method 400 and/or method 200, and the steps in the method(s) involving the components. At (1), a device or service may scan a first optical code, which may correspond to step 410 of method 400. This first optical code may correspond to the optical code encoding the server's network address and not the optical code encoding the signed URL. At (2), the device or service may decode the server's address and subsequently browse to or connect to the server, which in this example may be located at or associated with qrsensor.com. In various embodiments, (2) may correspond with step 420 and 430 of method 400. At (3), the device or service may scan a second optical code. This second optical code may correspond to the optical code encoding the signed URL, thus (3) may correspond to step 210 of method 200 or step 440 of method 400. After decoding the signed URL, at (4), the device or service may post the signed URL to the server. The process of (4) from decoding the signed URL to posting or transmitting it to the server may correspond with steps 220 and 230 of method 200 and step 450 and 460 of method 400. At (5), the server may call the signed URL and access the service endpoint in order to check if the data associated with the signed URL can be trusted. In this case, since the service endpoint is only being called to check the data, the data may have been included as part of the signed URL, and the server will subsequently extract the data from the signed URL once the signature has been validated from accessing the service endpoint. In this example schematic, the service endpoint may be located at or associated with qrsensor.com/locator. Since the server and service endpoint share a common domain, they may both be part of or associated with the organization or entity qrsensor. Step (5) may correspond to step 240 of method 200 or step 470 of method 400. An alternative to the sequence (3)→(4)→(5) may start at (6), where the device or service may scan a second optical code encoding a signed URL and post the signed URL to the server as explained for (4). However, in this sequence the server may also verify that the URL domain references a trusted domain, which as mentioned above may include comparing against a dynamic list of trusted domains that is based on a profile associated with the server's network address. The specific list of trusted domains may also depend on the network address decoded from the first optical code as different network addresses may be associated to different profiles with different lists of trusted domains. This verification step may be needed because at (7), the server calls the signed URL which leads to an external service endpoint that is located at or associated with trusteddomain-.com, which is different than the server's domain. The server may call this endpoint in order to get the data, which means the endpoint at trusteddomain.com may return the data to the server as a response to (7). Thus, after (2), two exemplary sequences may be (3)→(4)→(5) or (6)→(4)→(7), where both sequences comprise scanning an optical code encoding the signed URL and transmitting the signed URL to the server, with the difference being whether accessing the signed URL leads to a service endpoint with the same domain as the server or a different domain.

Figure 6:
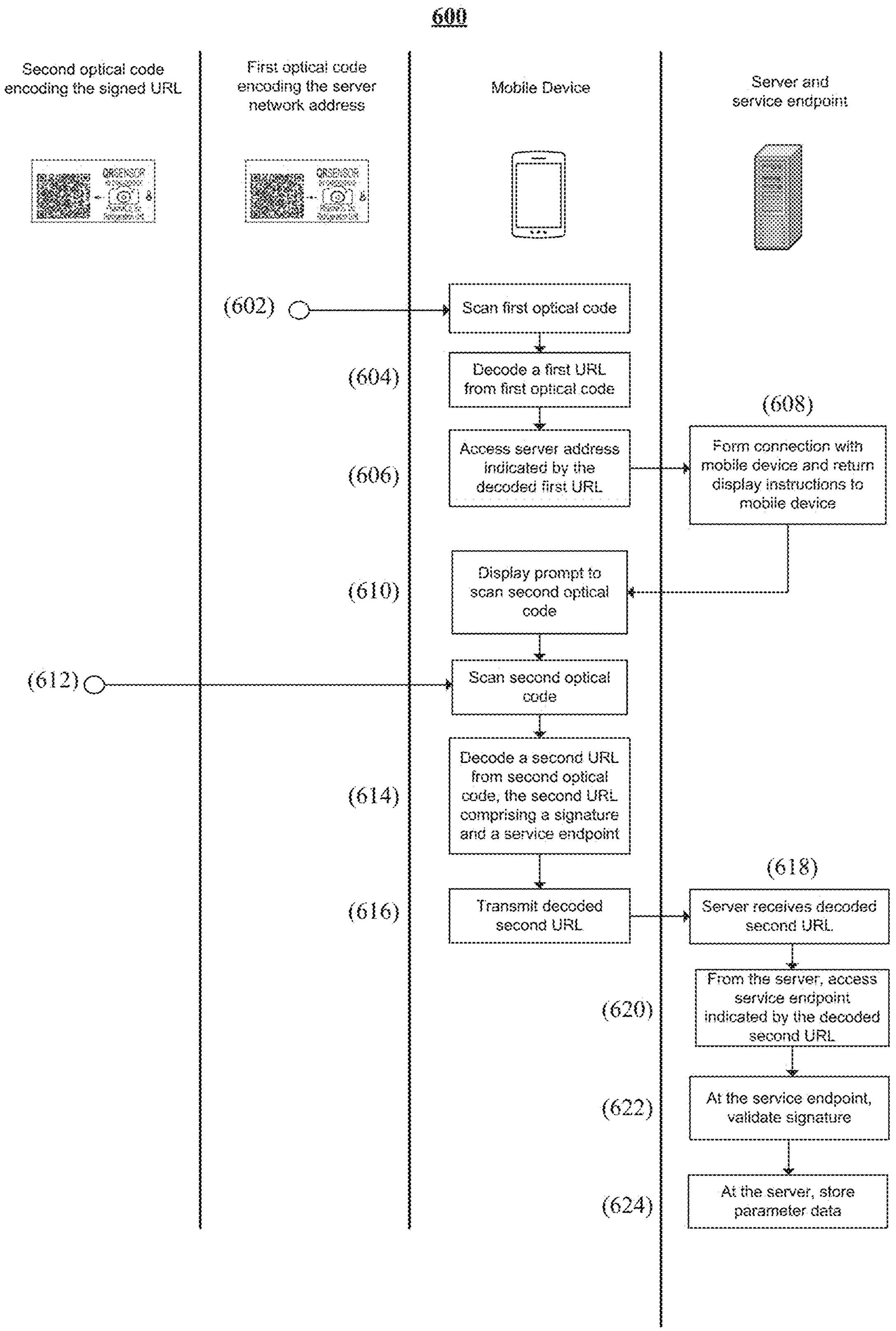
FIG. 6 illustrates a diagram with an example sequence of exchanges between the various components that may be involved in receiving secured data through optical codes.

FIG. 6 illustrates a diagram with an example sequence of exchanges 600 between various components that may be involved in an embodiment of method 400. In this example embodiment, the device or service 401 that may execute steps 410-460 is represented as a mobile device which comprises an optical sensor. Also, in this example, the server 402 and service endpoint that validates the signature in the URL are associated with the same domain and thus are represented as a single entity in the fourth column.

At 602, the mobile device may scan the first optical code using an optical sensor on the mobile device, where the first optical code encodes the network address of the server. In various embodiments, exchange 602 may correspond with step 410 of method 400. The mobile device may then decode the first URL at 604, where this first URL represents the address of the server. In various embodiments, exchange 604 may correspond with step 420 of method 400. The mobile device may then access the server's address at 606 in order to establish a connection between the server and the mobile device at 608. Once a connection has been successfully established with the mobile device, as part of 608, the server may return instructions to the mobile device to display a prompt on the mobile device. At 610, the mobile device may execute the instructions from the server to display a prompt for a user of the mobile device to scan a second optical code which encodes a second URL comprising the signature, or the signed URL. In various embodiments, one or more of exchanges 606-610 may correspond with step 430 of method 400.

Once the prompt has been displayed, at 612, the mobile device may detect or scan a second optical code using the optical sensor included on the mobile device. This second optical code may encode the signed URL, which also may or may not include data for parameters associated with an entity that is being monitored, as described above with respect to method 200. In various embodiments, exchange 612 may correspond with step 440 of method 400. At 614, the mobile device may decode the signed URL from the second optical code. In various embodiments, exchange 614 may correspond with step 450 of method 400. After decoding the signed URL, the mobile device may transmit the decoded signed URL to the server at 616 using the connection that was established at 608. In various embodiments, exchange 616 may correspond with step 460 of method 400. After receiving the signed URL at 618, the server may access the service endpoint indicated by the signed URL at 620. In this example embodiment, the server may not need to check whether the signed URL's domain is a trusted domain since the signed URL and server are associated with the same domain. At 622, the service endpoint may validate the signature in the signed URL in a manner corresponding to how the signature was originally generated. For example, and as mentioned above with respect to step 240 of method 200, this may comprise applying a hash function against underlying data and then comparing the result against the signature if the signature is a hash, or applying a private key to the signature if the signature was generated from a public key in a public key cryptography system. In various embodiments, one or more of exchanges 618-622 may correspond with step 470 of method 400. After the signature in the signed URL has been validated, the server may obtain data for various parameters either as a response from the service endpoint or by extracting the data from the signed URL.

Once the parameter data has been obtained, at 624, the server may handle or process the data according to the requirements in various embodiments, such as simply storing the parameter data. In various embodiments, exchange 624 may correspond with step 480 of method 400.

Figure 7:
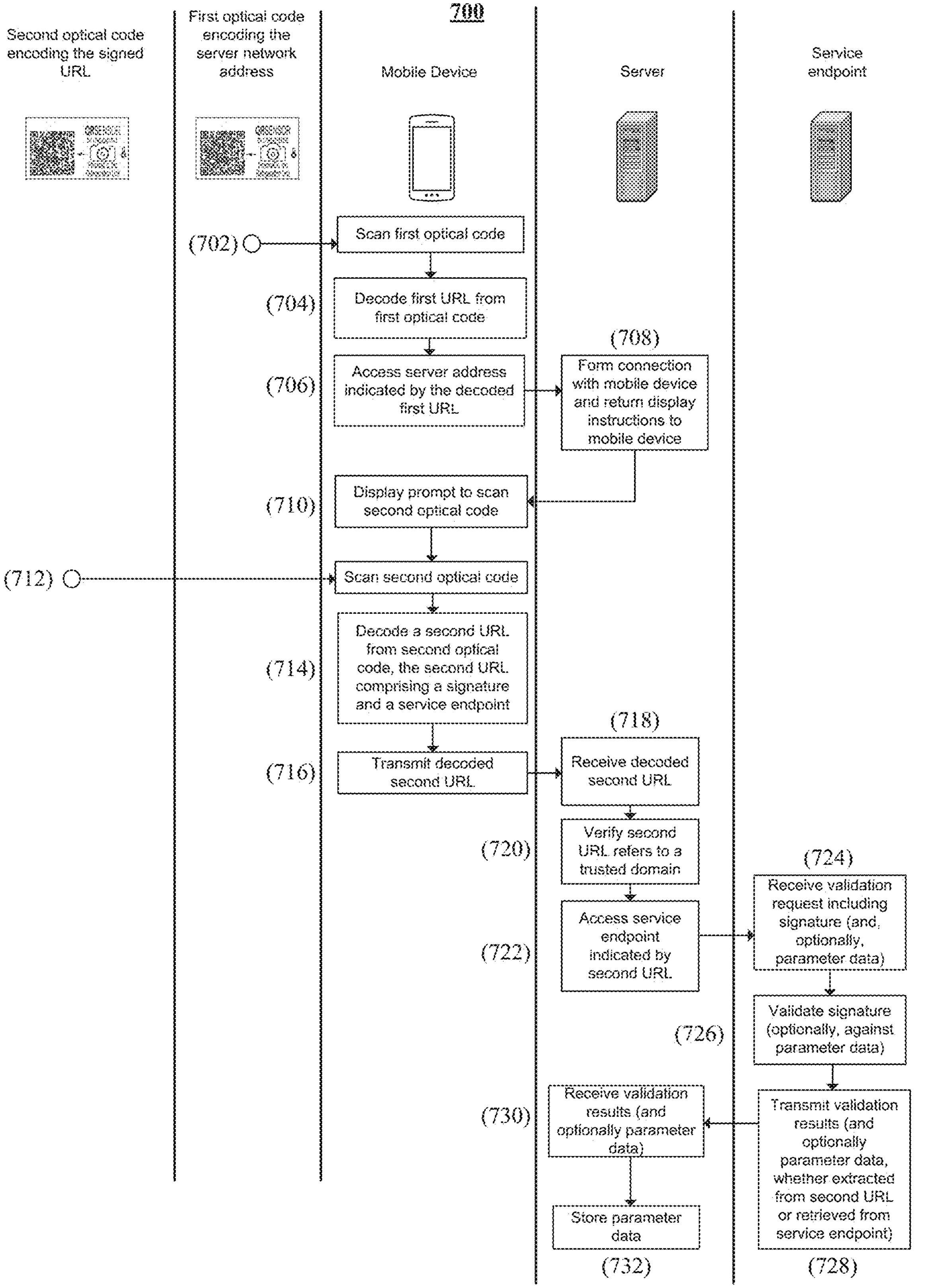
FIG. 7 illustrates a diagram with a second example sequence of exchanges between the various components that may be involved in receiving secured data through optical codes.

FIG. 7 illustrates a diagram with another example sequence of exchanges 700 between various components that may be involved in an embodiment of method 400. Similar to the example in FIG. 6, in this example embodiment, a mobile device comprising an optical sensor also represents the device or service 401 that may execute steps 410-460 of method 400. However, as opposed to FIG. 6, in this example, the server 402 and service endpoint that validates the signature in the signed URL are associated with different domains and are thus represented in separate columns.

At 702, the mobile device may scan the first optical code using the optical sensor on the mobile device, where the first optical code encodes the network address of the server. In various embodiments, exchange 702 may correspond with step 410 of method 400. At 704, the mobile device may decode the first URL indicating the server's network address from the first optical code. In various embodiments, exchange 704 may correspond with step 420 of method 400. The mobile device then accesses the server's address at 706 in order to establish a connection with the server at 708. As part of 708, the server may return instructions to the mobile device to display a prompt. And at 710, the mobile device may execute the instructions to display a prompt for a user to scan the second optical code encoding the URL with a signature, or the signed URL. In various embodiments, one or more of the exchanges from 706-710 may correspond to step 430 of method 400.

At 712, the mobile device may scan the second optical code using the optical sensor on the mobile device. This second optical code may encode the signed URL, which also may or may not include data for parameters associated with an entity that is being monitored. In various embodiments, exchange 712 may correspond with step 440 of method 400. At 714, the mobile device may decode the signed URL from the second optical code, which may correspond with step 450 of method 400. At 716 and 718, the mobile device may transmit the signed URL to the server and the server may receive the signed URL, respectively. In various embodiments, exchange 716 may correspond with step 460 of method 400. After the server receives the signed URL, because the server and the domain of the service endpoint indicated by the signed URL are different, the server at 720 may first verify that the signed URL refers to a trusted domain. Once the signed URL's domain has been verified, then the server at 722 may access the service endpoint indicated by the signed URL to request the service endpoint validate the signature in the signed URL. The service endpoint at 724 may then receive the signature, and optionally any parameter data that may be needed to validate the signature depending on the nature of the validation process. Then, at 726, the service endpoint may validate the signature, which in some embodiments may comprise validating the signature against the parameter data that was received along with the signature. As described above, this may be the case if the signature is a hash produced by applying a hash function to the parameter data. In such cases, validating the signature may comprise re-applying the hash function to the parameter data to validate if the resulting hash matches the hash that is the signature. At 728, the results of the signature validation may be transmitted from the service endpoint as a response back to the server. The parameter data that the service endpoint transmits may either be extracted from the second or signed URL if the URL included the data, or the parameter data may have been retrieved from some storage that is accessible by the service endpoint if the parameter data was not included in the signed URL. In various embodiments, one or more of the exchanges from 720 up to 728 may correspond with step 470 of method 400. When the server receives the signature validation results at 730, the server may also receive the parameter data as part of the response from the service endpoint. Alternatively, in embodiments where the service endpoint does not transmit the parameter data as part of the response, the server may extract the parameter data from the signed URL after receiving a positive validation result. However, regardless of how the server obtains the data, at 732, the server may handle or process the data according to the requirements in various embodiments, such as simply storing the parameter data. In various embodiments, exchange 732 may correspond with step 480 of method 400.

To further describe the method of receiving secured data, the present disclosure also presents an example of a potential practical application of the method described herein. This example comprises two optical codes, one encoding the network address of the server and the other encoding the signed URL, reflecting the sequence of exchanges in FIG. 6 and FIG. 7 as well as the steps of method 400. The context may be that, in the logistics sector, freight containers may need to be monitored in order to continuously track their location. When the container eventually arrives at its intended destination, various parties may need to be notified of that fact, especially with respect to which container in particular arrived at what particular location. As part of that process, perhaps due to the nature of the container's contents, it may also be necessary for additional information to accompany the notification of the container's arrival, such as the state of the location that the container arrived at. All of this information transfer may further need to remain secure to prevent any anomalies making their way into the process.

In this example application, a freight container may be fitted with an optical code, such as a QR code, which encodes identifying information specifically for that container, such as a unique serial number. Since the container may be owned, tracked, or otherwise associated with a specific organization, this optical code may also encode the network address of a server for that organization. When this optical code is scanned by a device or service, such as the mobile device of FIGS. 6 and 7, the identifying information of the specific freight container and the server of the associated organization may be retrieved. In other words, this optical code may correspond to the first optical code encoding the server network address in FIGS. 6 and 7. At the same time, a port warehouse that may be the intended destination of the freight container may be monitored in order to track the different containers that arrive at the warehouse. In other words, the warehouse may be the entity corresponding to a signed URL that is being monitored. To that end, a second optical code, such as another QR code, may be displayed on the wall of the warehouse. This second optical code may encode the signed URL as well as data for various parameters specific to this warehouse. In this specific example, the parameters may correspond with the elements in Table 2 and thus the signed URL may include the elements and contents depicted in Table 2. However, in various other example applications, the signed URL encoded in the second optical code may include more or less elements or may not include any data elements at all, and may still proceed in a largely similar manner as this example application.

When the freight container arrives at the port warehouse, a dockworker may be tasked with recording the container's arrival at that specific warehouse. To do so, the dockworker may begin by scanning the optical code on the freight container using a mobile device. From scanning this optical code, the network address of the server may be decoded and accessed in order to establish a connection between the mobile device and the server. The identifying information for the freight container may also be decoded and immediately transmitted to the server, where that information is temporarily buffered and subsequently matched with the signed URL that arrives at the server. The mobile device then receives and executes instructions from the server to display a prompt to scan the optical code on the wall of the warehouse in order to record that the freight container arrived at that specific warehouse.

Following the display prompt, the dockworker may then scan the second optical code located on the wall of the warehouse. This may conclude the responsibilities of the dockworker, and they may proceed onto another task, which may include repeating the process with another freight container. In the meantime, the mobile device may decode the signed URL from the second optical code that was just scanned. In this example, the optical code may have encoded the signed URL including all of the elements of Table 2 in the form of a URL, so when the optical code is scanned and decoded, the signed URL is immediately retrieved. The mobile device may then transmit the signed URL to the server which it had connected to after scanning the first optical code that was on the freight container. Once the mobile device confirms the transmission to the server was successful, it may close the connection to the server as this may conclude the mobile device's involvement in the process.

In this example application, the server and the signed URL may be associated with different domains. Specifically, the server may be associated with the domain for some organization server.com while the signed URL may be associated with the domain for some organization organization.com. As a result, after the server receives the signed URL from the mobile device and notices that the signed URL is associated with an external domain, it may search through a list of known and trusted domains for organization. Only after verifying that the signed URL's domain is trusted does the server access the service endpoint indicated by the signed URL. The server may accomplish this by submitting an HTTP GET request to the service endpoint. In this example application, after the service endpoint has validated the signature against the supplied data that had been part of the signed URL, the service endpoint may respond to the server's GET request with the positive validation result and the supplied data originally in the signed URL. In other words, the service endpoint receives the GET request from the server, decodes the signed URL to validate the signature and parse the data included in the signed URL, and then returns the validation result and a JSON document with the data as a response to the server. After the server receives the data from the service endpoint corresponding to the various parameters of the port warehouse, the server may then store that data along with the identifying information for the freight container it had previously buffered. The result may be that the server records, in a secure manner through the use of the two optical codes and signed URL, the fact that the freight container had arrived at the port warehouse, which includes the fact that the warehouse is located at a specific latitude-longitude coordinate and that the container arrived at some timestamp. The server may then also be able to record that, at the time of arrival, the port warehouse had specific temperature and humidity level, which corresponds to the elements from Table 2 that may have been included in the signed URL.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 8:
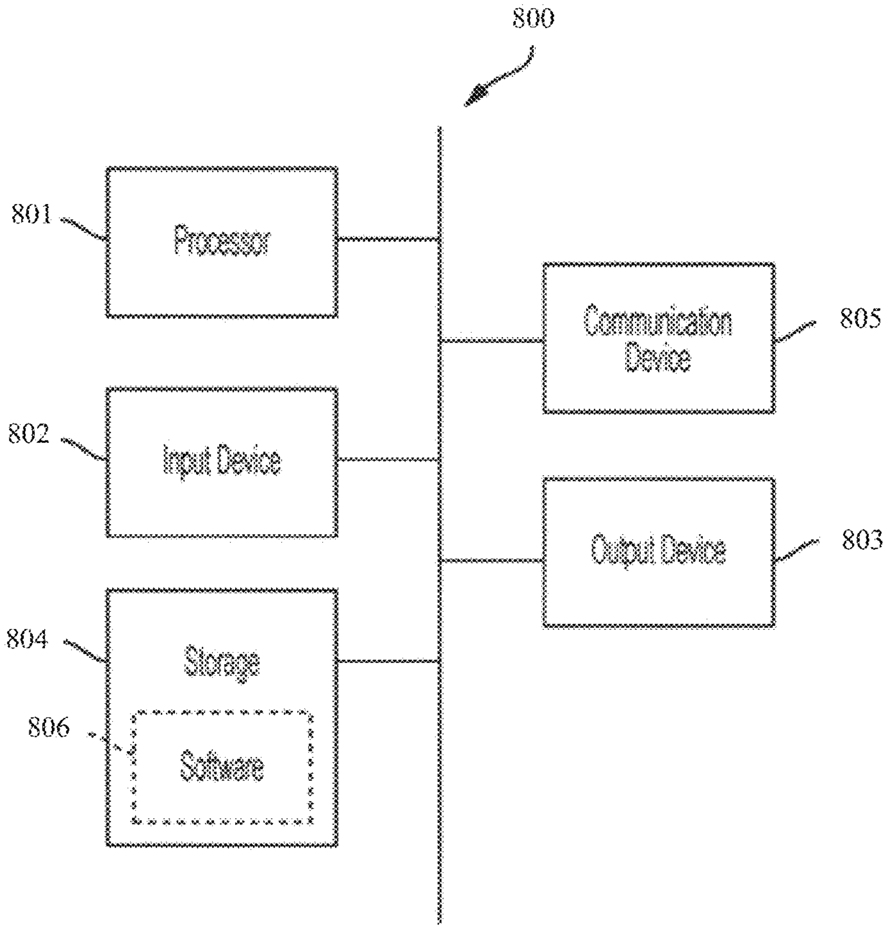
FIG. 8 illustrates an example computer system.

FIG. 8 illustrates an example of a computer in accordance with one embodiment. Computer 800 can be a component of a data collection system for configuring the system and viewing the collected data. In some embodiments, computer 800 is configured to execute a method for receiving secured data through optical codes and URLs, such as method 200 of FIG. 2. Alternatively, computer 800 can be configured to execute a method for receiving secured data using two optical codes, one encoding the server's network address and the other encoding the signed URL, such as method 400 of FIG. 4.

Computer 800 can be a host computer connected to a network. Computer 800 can be a client computer or a server. As shown in FIG. 8, computer 800 can be any suitable type of microprocessor-based device, such as a personal computer, workstation, server, videogame console, or handheld computing device, such as a phone or tablet. The computer can include, for example, one or more of processor 801, input device 802, output device 803, storage 804, and communication device 805. Input device 802 can generally correspond to those described above and can either be connectable or integrated with the computer.

Input device 802 can be any suitable device that provides input, such as a touch screen or monitor, keyboard, mouse, or voice-recognition device. Output device 803 can be any suitable device that provides output, such as a touch screen, monitor, printer, disk drive, or speaker.

Storage 804 can be any suitable device that provides storage, such as an electrical, magnetic, or optical memory, including a RAM, cache, hard drive, CD-ROM drive, tape drive, removable storage disk, or other non-transitory computer readable medium. Storage 540 can include one storage device or more than one storage device. As used herein, the terms storage, memory, and/or storage medium/media may refer to singular and/or plural devices which may store data and/or code/instructions individually, redundantly, and/or in cooperation with one another, for example in a local and/or cloud storage environment. Communication device 805 can include any suitable device capable of transmitting and receiving signals over a network, such as a network interface chip or card. The components of the computer can be connected in any suitable manner, such as via a physical bus or wirelessly. Storage 804 can be a non-transitory computer-readable storage medium comprising one or more programs, which, when executed by one or more processors, such as processor 801, cause the one or more processors to execute methods described herein.

Software 806, which can be stored in storage 804 and executed by processor 801, can include, for example, the programming that embodies the functionality of the present disclosure (e.g., as embodied in the systems, computers, servers, and/or devices as described above). In some embodiments, software 806 can be implemented and executed on a combination of servers such as application servers and database servers.

Software 806, or part thereof, can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 804, that can contain or store programming for use by or in connection with an instruction execution system, apparatus, or device.

Software 806 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 800 can implement any operating system suitable for operating the network. Software 806 can be written in any suitable programming language, such as C, C++, Java, or Python. In various embodiments, application software embodying the functionality of the present disclosure can be deployed in different configurations, such as in a client/server arrangement or through a web browser as a Web-based application or Web service, for example.

The foregoing description sets forth exemplary models, parameters and the like. It should be recognized, however, that such description is not intended as a limitation on the scope of the present disclosure but is instead provided as a description of exemplary embodiments. The illustrative embodiments described above are not intended to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. In the foregoing description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present disclosure also relates to a device for performing the operations herein. This device may be specially constructed for the required purposes, or it may include a general purpose computer selectively activated or reconfigured by a computer program stored in the computer. Such a computer program may be stored in a non-transitory, computer readable storage medium, such as, but not limited to, any type of disk, including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referenced in this disclosure may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method for receiving secured data, comprising:

at a mobile device comprising an optical sensor:

detecting an optical code by the optical sensor, wherein the optical code is physically associated with an entity that is being monitored;

decoding a URL encoded in the optical code, wherein the URL comprises a first contiguous string of characters forming a signature, and wherein the URL comprises a second contiguous string of characters, separate from the first contiguous string of characters, forming an indication of a service endpoint for performing validation of the signature to confirm a trusted status of the mobile device; and transmitting the URL to a server; and at the server:

accessing the service endpoint represented by the URL for performing validation of the signature; and in accordance with receiving a positive validation result for the signature, storing data for one or more parameters associated with the entity.

2. The method of claim 1, wherein the URL comprises the data for the one or more parameters associated with the entity.

3. The method of claim 1, wherein the signature is generated based on the data for the one or more parameters.

4. The method of claim 1, wherein the data comprises measurement data associated with the entity.

5. The method of claim 1, wherein the data comprises identifying information associated with the entity.

6. The method of claim 1, wherein the service endpoint and the server are associated with a same domain.

7. The method of claim 1, wherein accessing the service endpoint for performing validation of the signature comprises sending the signature to the service endpoint.

8. The method of claim 1, wherein accessing the service endpoint comprises sending the data for the one or more parameters to the service endpoint.

9. The method of claim 1, wherein accessing the service endpoint comprises sending authentication information used for authenticating into the service endpoint.

10. The method of claim 1, further comprising: in accordance with receiving the positive validation result and prior to storing the data for the one or more parameters, extracting the data from the URL.

11. The method of claim 1, further comprising: in accordance with receiving the positive validation result and prior to storing the data for the one or more parameters, receiving the data from the service endpoint.

12. The method of claim 1, further comprising:

at the server, prior to accessing the service endpoint, determining that a domain of the service endpoint is a trusted domain.

13. The method of claim 12, wherein determining that the domain is a trusted domain comprises comparing the domain against a list of trusted domains, wherein the list of trusted domains is determined based on a profile corresponding to the URL.

14. The method of claim 1, further comprising, at an optical code display device, generating and displaying the optical code.

15. The method of claim 14, wherein the optical code display device automatically updates the optical code at predetermined time intervals.

16. The method of claim 1, further comprising:

at the mobile device prior to detecting the optical code, detecting a second optical code indicating a network address of the server.

17. The method of claim 16, further comprising, in response to detecting the second optical code, displaying a prompt to detect the optical code.

18. The method of claim 16, further comprising transmitting an identifying value of a second entity to the server, wherein the identifying value is decoded from the second optical code, and wherein the second entity is associated with the entity that is being monitored.

19. A system for receiving secured data, the system comprising one or more processors and a memory coupled to the one or more processors, the memory storing instructions executable by the processors to cause the system to:

at a mobile device comprising an optical sensor:

detect an optical code by the optical sensor, wherein the optical code is physically associated with an entity that is being monitored;

decode a URL encoded in the optical code, wherein the URL comprises a first contiguous string of characters forming a signature, and wherein the URL comprises a second contiguous string of characters, separate from the first contiguous string of characters, forming an indication of a service endpoint for performing validation of the signature to confirm a trusted status of the mobile device; and transmit the URL to a server; and at the server:

access the service endpoint represented by the URL for performing validation of the signature; and in accordance with receiving a positive validation result for the signature, storing data for one or more parameters associated with the entity.

20. One or more computer-readable non-transitory storage media storing software for receiving secured data, the software comprising instructions executable by one or more processors of a system to cause the system to:

at a mobile device comprising an optical sensor:

detect an optical code by the optical sensor, wherein the optical code is physically associated with an entity that is being monitored;

decode a URL encoded in the optical code, wherein the URL comprises a first contiguous string of characters forming a signature, and wherein the URL comprises a second contiguous string of characters, separate from the first contiguous string of characters, forming an indication of a service endpoint for performing validation of the signature to confirm a trusted status of the mobile device; and transmit the URL to a server; and at the server:

access the service endpoint represented by the URL for performing validation of the signature; and in accordance with receiving a positive validation result for the signature, storing data for one or more parameters associated with the entity.

* * * * *